United States Patent
Mueller-Haas et al.

(10) Patent No.: US 9,617,895 B2
(45) Date of Patent: Apr. 11, 2017

(54) DEVICE FOR EXHAUST-GAS PURIFICATION AND MOTOR VEHICLE HAVING THE DEVICE

(71) Applicant: EMITEC GESELLSCHAFT FUER EMISSIONSTECHNOLOGIE MBH, Lohmar (DE)

(72) Inventors: Klaus Mueller-Haas, Cologne (DE); Rolf Brueck, Bergisch-Gladbach (DE)

(73) Assignee: EMITEC Gesellschaft fuer Emissionstechnologie mbH, Lohmar (DE)

(*) Notice: Subject to any disclaimer, the term of this patent is extended or adjusted under 35 U.S.C. 154(b) by 0 days.

(21) Appl. No.: 14/474,462

(22) Filed: Sep. 2, 2014

(65) Prior Publication Data
US 2014/0366513 A1 Dec. 18, 2014

Related U.S. Application Data

(63) Continuation of application No. PCT/EP2013/054094, filed on Feb. 28, 2013.

(30) Foreign Application Priority Data

Mar. 2, 2012 (DE) .......... 10 2012 004 291
Sep. 12, 2012 (DE) .......... 10 2012 017 976

(51) Int. Cl.
*F01N 13/08* (2010.01)
*F01N 3/20* (2006.01)
(Continued)

(52) U.S. Cl.
CPC .......... *F01N 3/208* (2013.01); *F01N 3/2066* (2013.01); *F01N 3/2803* (2013.01);
(Continued)

(58) Field of Classification Search
CPC .............. F01N 3/2892; F01N 2240/20; F01N 2610/00; F01N 2610/02; F01N 2610/1453; F01N 2470/18
See application file for complete search history.

(56) References Cited

U.S. PATENT DOCUMENTS 5,489,153 A * 2/1996 Berner .................. B01F 5/061
366/337
6,516,610 B2 2/2003 Hodgson
(Continued)

FOREIGN PATENT DOCUMENTS

CN 101981285 A 2/2011
DE 102005063081 A1 7/2007
(Continued)

OTHER PUBLICATIONS

Machine translation of DE 102005063081 A1, accessed on Aug. 7, 2015.*
(Continued)

*Primary Examiner* — Jonathan Matthias
(74) *Attorney, Agent, or Firm* — Laurence A. Greenberg; Werner H. Stemer; Ralph E. Locher

(57) ABSTRACT

A device includes a pipeline section for an exhaust gas flow. The pipeline section has an inlet end, an outlet end, a rectilinear section and a protuberance having an opening for installing a metering device for a liquid additive (in particular urea/water solution) in the rectilinear section. The protuberance has a height and an extent and the extent is at least twice as large as the height. At least one respective disk-shaped honeycomb body is disposed at each of the inlet end and the outlet end. A central axis of the opening is oriented toward one of the disk-shaped honeycomb bodies. A motor vehicle having the device is also provided.

17 Claims, 5 Drawing Sheets

(51) Int. Cl.
*F01N 3/28* (2006.01)
*B01D 46/24* (2006.01)

(52) U.S. Cl.
CPC ........ *F01N 3/2892* (2013.01); *B01D 46/2455* (2013.01); *B01D 2046/2488* (2013.01); *F01N 2240/20* (2013.01); *F01N 2330/36* (2013.01); *F01N 2330/40* (2013.01); *F01N 2610/02* (2013.01); *F01N 2610/14* (2013.01); *F01N 2610/1453* (2013.01); *Y02T 10/24* (2013.01)

(56) References Cited

U.S. PATENT DOCUMENTS

| | | | |
|---|---|---|---|
| 7,941,995 B2 | 5/2011 | Goss et al. | |
| 8,082,732 B2 | 12/2011 | Nefischer | |
| 8,109,081 B2 | 2/2012 | Perry et al. | |
| 8,240,135 B2 | 8/2012 | Zhang | |
| 8,627,649 B2 | 1/2014 | Peters | |
| 9,249,708 B2 | 2/2016 | Mortensen et al. | |
| 2002/0108368 A1* | 8/2002 | Hodgson | 60/286 |
| 2002/0116916 A1* | 8/2002 | Hofmann | F01N 3/2066 60/282 |
| 2009/0019843 A1 | 1/2009 | Levin et al. | |
| 2009/0084094 A1 | 4/2009 | Goss et al. | |
| 2009/0205325 A1 | 8/2009 | Kistner et al. | |
| 2009/0262599 A1* | 10/2009 | Kohrs et al. | 366/337 |
| 2010/0005791 A1* | 1/2010 | Ranganathan et al. | 60/310 |
| 2010/0212292 A1 | 8/2010 | Rusch et al. | |
| 2010/0319331 A1* | 12/2010 | Wagner | F01N 3/0238 60/311 |
| 2011/0099974 A1* | 5/2011 | Griffin | F01N 3/2066 60/274 |
| 2011/0131958 A1 | 6/2011 | Adelman et al. | |
| 2011/0283685 A1 | 11/2011 | Kotrba et al. | |

FOREIGN PATENT DOCUMENTS

| | | |
|---|---|---|
| DE | 202008001547 U1 | 4/2008 |
| DE | 102006058402 A1 | 6/2008 |
| DE | 202008001022 U1 | 6/2009 |
| DE | 102008041486 A1 | 2/2010 |
| DE | 102010020767 A1 | 1/2011 |
| DE | 102011006913 A1 | 11/2011 |
| DE | 102010039121 A1 | 2/2012 |
| JP | 2003507612 A | 2/2003 |
| RU | 2405947 C2 | 12/2010 |
| WO | 2008135112 A1 | 11/2008 |
| WO | 2009045708 A1 | 4/2009 |

OTHER PUBLICATIONS

"Height". Dictionary.com Unabridged. Random House, Inc. Apr. 17, 2016. <Dictionary.comhttp://www.dictionary.com/browse/height>.*

* cited by examiner

DEVICE FOR EXHAUST-GAS PURIFICATION AND MOTOR VEHICLE HAVING THE DEVICE

CROSS-REFERENCE TO RELATED APPLICATION

This is a continuation, under 35 U.S.C. §120, of copending International Application No. PCT/EP2013/054094, filed Feb. 28, 2013, which designated the United States; this application also claims the priority, under 35 U.S.C. §119, of German Patent Application DE 10 2012 017 976.6, filed Sep. 12, 2012, and German Patent Application DE 10 2012 004 291.4, filed Mar. 2, 2012; the prior applications are herewith incorporated by reference in their entirety.

BACKGROUND OF THE INVENTION

Field of the Invention

The invention relates to a device for exhaust-gas purification. The device is an exhaust-gas purification module that can be integrated into an exhaust-gas treatment device for the purification of the exhaust gases of an internal combustion engine. The exhaust-gas purification module includes a metering device for metering a liquid additive into the exhaust-gas flow. The invention also relates to a motor vehicle having the device.

In the automotive field, in particular for the purification of the exhaust gases of internal combustion engines, exhaust-gas treatment methods in which a liquid additive is fed into the exhaust gas are commonly used. A particularly commonly used exhaust-gas treatment method is the selective catalytic reduction (SCR) method in which nitrogen oxide compounds in the exhaust gas are reduced with the aid of a reducing agent. Ammonia is often used as a reducing agent. Ammonia is normally not stored in motor vehicles as ammonia itself but rather in the form of a reducing agent precursor solution which can be converted to form ammonia. The conversion may be performed either within the exhaust system in the presence of the exhaust gas and/or outside the exhaust system in a reactor provided specifically for that purpose.

The reducing agent precursor solution is stored in a tank and can be fed to the exhaust-gas treatment device by using a delivery unit. A particularly commonly used reducing agent precursor solution is liquid urea-water solution, which is available, for example, under the trademark AdBlue® with a urea content of 32.5%. Both the reducing agent and also the reducing agent precursor may accordingly be an additive.

A type of injector or a type of nozzle may be used for metering the liquid additive into the exhaust-gas flow. During the metering of liquid additive into an exhaust-gas flow, it is an aim to attain as uniform as possible a distribution of the liquid additive and of its decomposition products in the exhaust-gas flow. A good distribution in the exhaust-gas flow is advantageous, in particular, for the conversion of the reducing agent precursor solution within the exhaust gas. Specifically, the conversion then takes place predominantly by thermal action (thermolysis), with the heat of the exhaust-gas flow being utilized for the conversion.

Furthermore, the valves or nozzles that are commonly used in a metering device are temperature-sensitive. For example, an electrically operated solenoid valve that controls the metering of the liquid additive can be easily damaged by the heat of the exhaust-gas flow. An exhaust-gas treatment device must therefore preferably be constructed in such a way that the temperature at the metering device does not exceed a predefined limit temperature.

Additionally, deposits of liquid additive in the region of the metering device are highly critical. In particular, if urea-water solution is used as the liquid additive, the urea may form solid crystalline deposits on the metering device and/or in the exhaust line in the region of the metering device. The deposits may firstly lead to blockage of the metering device, whereby the metering is impeded. Furthermore, such deposits may abruptly become detached and then, as solid particles, cause damage to exhaust-gas treatment components disposed downstream of the metering device as viewed in the flow direction.

Furthermore, the integration of the metering device into a motor vehicle or working machine should be possible in as inexpensive a manner as possible. In particular, it is desirable for inexpensive integration of a metering device into an exhaust-gas treatment device to be possible, if appropriate also by way of a retrofit set, even for low-volume production runs of vehicles (for example in the field of specialized machines and utility vehicles).

SUMMARY OF THE INVENTION

It is accordingly an object of the invention to provide a device for exhaust-gas purification and a motor vehicle having the device, which overcome the hereinafore-mentioned disadvantages and solve or at least alleviate the highlighted technical problems of the heretofore-known devices and motor vehicles of this general type. It is sought, in particular, to specify an especially advantageous device including a metering device for a liquid additive for an exhaust-gas treatment device, in which the device, in particular, is suitable or expedient for carrying out the SCR method in the exhaust-gas treatment device.

With the foregoing and other objects in view there is provided, in accordance with the invention, a device, comprising a pipeline section for an exhaust-gas flow, the pipeline section having an inlet end, an outlet end, a rectilinear section and a protuberance with an opening for the installation of a metering device for a liquid additive in the rectilinear section, wherein the protuberance has a height and an extent, and the extent is at least twice as great as the height, and furthermore, in each case at least one disk-shaped honeycomb body is disposed at the inlet end and at the outlet end, wherein a central axis of the opening is directed toward one of the disk-shaped honeycomb bodies. The central axis of the opening is preferably directed centrally toward one of the disk-shaped honeycomb bodies. In this case, the expression "centrally" means that the central axis intersects the honeycomb body in a region covering less than 20% of an end face of the honeycomb body, wherein the region is disposed, approximately in circular form, in the center of the face surface.

It is preferable in this case for the disk-shaped honeycomb body at the outlet end and/or at the inlet end to form the termination(s) of the pipeline section.

The device is, in particular, an exhaust-gas purification module or an exhaust-gas purification component which can be (retroactively) inserted or integrated into an exhaust-gas treatment device or into an exhaust system. An exhaust system is the entirety of all of the modules and components that are used on an internal combustion engine for the purification of the exhaust gases. It is thus possible for the inlet end and the outlet end to each be connected to a section of an exhaust line. The pipeline section preferably has, on both ends, connection devices for the connection of line sections. The connection devices may preferably be devices for forming a welded connection between the pipeline section and further sections of an exhaust line. Such connection devices may, for example, be formed by a rim of the pipeline section. A device for forming a welded connection may also include an oblique edge on the rim of a pipeline section, which oblique edge permits the formation of a V-shaped weld seam for connecting the pipe section to adjoining sections of an exhaust line. It is also possible for the connection devices to be formed in the manner of a flange or in the manner of a plug-in connection.

The pipeline section preferably has a cylindrical shape, in particular in the rectilinear section (straight-running section of the pipeline section). The pipeline section preferably has a circular cross-sectional area with a diameter. The circular cross-sectional area and the cylindrical shape preferably define a basic shape. The pipeline section may have indentations, protuberances, constrictions or widenings that deviate from the basic shape.

Furthermore, in a rectilinear section, there is provided (exactly) one protuberance with an opening for the installation of the metering device for the liquid additive, wherein the protuberance has a height and an extent, and the extent is at least twice as great as the height. Thus, in a side view, the protuberance has the appearance of an acute triangle, wherein the opening is provided on the short cathetus or leg. In order to characterize the protuberance, the pipeline section may notionally or intellectually be divided into a cylindrical rectilinear section and a protuberance "mounted thereon," in such a way that the geometric sizes of the protuberance can be readily determined with reference to the cylindrical rectilinear section. In this case, it is advantageous for the additive to be metered into the cylindrical rectilinear section at as shallow an angle as possible and/or with as broad an inlet region as possible. Accordingly, there is also provided in the protuberance a spreading volume for the metered additive, which spreading volume is not overly exposed to the exhaust-gas flow and thus also has a less intense influence on the formation of a desired spray pattern in the protuberance. It is therefore predefined in this case that the extent of the protuberance (parallel to the direction of extent of the pipeline section) should be greater than the height of the protuberance (perpendicular to the extent) at least by a factor of 2, in particular by a factor of 2.5 or even by a factor of 3. It has furthermore been found that the factor generally should not exceed a value of 4.5, because then, under some circumstances, adverse flow conditions can arise in the protuberance, the protuberance can no longer be filled with additive over the extent, and/or the dimensions of the device are too large for (retroactive) installation into an exhaust system.

The inlet end and the outlet end each form an (open) end face of the pipeline section. In each case one disk-shaped honeycomb body is disposed close to or flush with the inlet end and/or the outlet end. An exhaust-gas flow that enters through the inlet end passes the disk-shaped honeycomb body at the inlet end. When the exhaust-gas flow has passed the pipeline section, it exits the pipeline section through the outlet end. Within the pipeline section between the inlet end and the outlet end, a flow direction for the exhaust-gas flow can be assumed. The metering device is situated downstream of the inlet and upstream of the outlet end as viewed in the flow direction.

The metering device may preferably have an injector for the controlled metering of the liquid additive and/or a nozzle for the atomization of the liquid additive. A nozzle of the metering device is preferably constructed to distribute the liquid additive in the protuberance and/or exhaust-gas flow by way of a spray cone. The spray cone has, for example, an opening angle of between 5° and 40°, wherein a central position of the metering device can be assumed. Devices for reducing a flow of heat to an injector disposed in the metering device are advantageously also disposed on the metering device. The devices may, for example, include heat shield plates, cooling ribs and/or a liquid-type cooling configuration.

For this purpose, the protuberance includes an opening which serves for the fixing of the metering device. The opening may be disposed in an (areal) flank of the protuberance, wherein the flank and a honeycomb body positioned opposite form an angle. It is thereby ensured that the metering direction of the metering device points toward the center of the honeycomb body at a shallow angle. In this case, the metering direction generally corresponds to the central axis of the opening. The metering direction or central axis may be oriented in or counter to the flow direction.

At least one of the disk-shaped honeycomb bodies of the device, and preferably all of the disk-shaped honeycomb bodies of the device, include metallic foils. The disk-shaped honeycomb body is preferably composed of metallic foils that are coiled, wound and/or stacked. The honeycomb bodies are preferably produced from a stack of metallic foils that is wound in an S-shaped form (a so-called S form). If multiple stacks are used, they can be disposed adjacent one another, and wound with one another, as a U-shaped and/or V-shaped configuration and inserted into a housing (a so-called SM form). Both configurations normally have in common the fact that all of the ends of the stack are directed to the outside (that is to say bear against a housing), whereas the bends (s, v, u) are positioned at the inside. It is preferably the case that, in the stack, corrugated metal foils and smooth metal foils are present in alternating fashion, with the foils in each case delimiting channels of the honeycomb body. The walls of the channels may be smooth (flat and/or free from fixtures in the profile direction of the channels) and/or may have projections, blades, holes and/or diverting surfaces for the exhaust gas (also collectively referred to as structures). It is accordingly possible for an exhaust-gas flow that passes through the disk-shaped honeycomb bodies to be homogenized and/or mixed (for example with regard to flow speed, component flow direction, temperature and/or the like).

The disk-shaped honeycomb bodies at the inlet end and/or at the outlet end may firstly serve for homogenizing the flow. This makes it possible for the metering device to feed the liquid additive to the exhaust-gas flow with substantially no influence from further components within the exhaust-gas treatment device. The disk-shaped honeycomb bodies preferably break up, to the greatest possible extent, vortices that are present in the exhaust-gas flow, thus ensuring defined flow conditions in the region in which additive is metered in. A (smooth) disk-shaped honeycomb body at the outlet end homogenizes the exiting exhaust-gas flow that has been mixed with the liquid additive. The disk-shaped honeycomb body has a honeycomb body axis that lies in the center of the honeycomb body. The channels of the honeycomb body preferably extend parallel to the honeycomb body axis. There is preferably an impingement angle of between 0° and 90° [degrees], in particular between 0 and 45 degrees, between the honeycomb body axis and the metering direction. The angle thus preferably also exists between the honeycomb body axis and a central axis of the spray cone.

At least one disk-shaped honeycomb body may also be implemented with an electric heater. It is preferable in this case for at least a part of the walls of the honeycomb body to be traversed by a regulated flow of current, and to thus be heated due to the electrical resistance. If required, the disk-shaped honeycomb body may also have multiple zones that can be activated/deactivated independently of one another. It is preferable for at least that honeycomb body onto which the liquid additive is dispensed to be implemented with an electric heater.

In accordance with another feature of the device of the invention, at least one of the two disk-shaped honeycomb bodies, at the inlet end or at the outlet end, has a conical form or shape.

This means, in particular, that at least one disk-shaped honeycomb body is constructed in the manner of a cone. In this case, the channels may likewise widen/narrow in conical fashion. It is furthermore possible that, in this case too, the walls of the channels may be smooth (flat and/or free from fixtures in the profile direction of the channels) and/or may have projections, blades, holes and/or diverting surfaces for the exhaust gas (also collectively referred to as structures). It is preferable for at least that disk-shaped honeycomb body onto which the liquid additive is dispensed to be formed in the manner of a cone. Whether the conically shaped honeycomb body or the channels of the honeycomb body widen or narrow is determined on the basis of the direction of the exhaust-gas flow through the device.

It is particularly advantageous for the honeycomb body to have a conical shape at the outlet end. The liquid additive that is fed in by using the metering device impinges on the honeycomb body at the outlet end. Due to the conical shape, the probability of the liquid additive impinging on the channel walls of the honeycomb body, and evaporating there, is increased. Diverting surfaces or blades also increase the probability of impingement of the liquid additive, wherein then, evaporation, in particular, also takes place on the blades or diverting surfaces.

In accordance with a further advantageous feature of the device of the invention, a nozzle is provided in the pipeline section between the disk-shaped honeycomb body at the inlet end and the metering device, and by using the nozzle the exhaust-gas flow is focused centrally in the pipeline section. A nozzle of this type may, for example, be formed with a continuously narrowing tubular component which is inserted into the pipeline section. The exhaust-gas flow that is focused in this way absorbs the liquid additive that is fed in by using the metering device, in a particularly effective manner.

Through the use of the above-described device, an exhaust-gas purification module is provided which can be integrated into different exhaust-gas treatment devices. For the integration of the exhaust-gas purification module into an exhaust-gas treatment device, it is in particular the case that the exhaust-gas flow prevailing in the region of the metering device does not have to be considered separately from a construction aspect. Through the use of the above-described device, the metering of liquid additive and the distribution of the liquid additive in the flow preferably takes place independently of adjoining components. In particular, there is no need for individual adaptation of the metering device to different components positioned upstream and/or downstream in the exhaust-gas treatment device. Also, components of an exhaust-gas treatment device that are disposed downstream of the above-described device as viewed in the flow direction can be constructed without regard to the metering of liquid additive.

In accordance with an added particularly advantageous feature of the device of the invention, the length of the pipeline section from the inlet end to the outlet end corresponds to more than two times, and less than five times, a diameter of the pipeline section. The diameter refers to the predominant diameter (without the height of the protuberance) as viewed over the length of the pipeline section and this is also referred to hereinafter as the "primary diameter." Through the use of the selected length of the pipeline section, it is firstly possible to ensure a uniform distribution of the liquid additive in the exhaust-gas flow. On the other hand, the structural length of the device is small enough that the device can readily be integrated (even retroactively) into an exhaust-gas treatment device. The diameter of the exhaust-gas treatment device (in the field of automotive engineering) is preferably between 50 mm [millimeters] and 200 mm, particular preferably between 60 mm and 130 mm.

The metering device is disposed in the pipeline section after the inflow end, preferable after an inflow length of at least 100 mm. The inflow length describes a distance between an outlet surface of the at least one disk-shaped honeycomb body at the inlet end and an imaginary (perpendicular) section plane through the pipeline section, in which section plane are situated the metering device and, in particular, an inlet point for liquid additive into the pipeline section at the metering device. Proceeding from the imaginary section plane in the flow direction, there is preferably an outflow length of at least 100 mm to an inlet surface of a further disk-shaped honeycomb body or of the outlet end.

In accordance with an additional preferable feature of the device of the invention, the at least one disk-shaped honeycomb body has, at the inlet end, a channel density of 20 cpsi to 200 cpsi (channels per square inch). The channel density in the disk-shaped honeycomb body at the inlet end preferably lies in the range from 40 cpsi to 100 cpsi. 100 cpsi corresponds to a channel density of 15.5 channels per square centimeter. Through the use of such a selected channel density of the disk-shaped honeycomb body at the inlet end, it is possible to achieve adequate homogenization of the exhaust-gas flow entering the device, in such a way that the metering of liquid additive by using the metering device can take place without influence from exhaust-gas purification components situated upstream in the flow direction of the device.

The at least one disk-shaped honeycomb body at the outlet end preferably likewise has a channel density of 20 cpsi (channels per square inch) to 200 cpsi, but in particular of 40 to 100 cpsi.

In accordance with yet another advantageous feature of the device of the invention, the pipeline section has, between the disk-shaped honeycomb body at the outlet end and the outlet end, a flow alignment section in which the cross section of the pipeline section is at least partially offset. In this case, an exhaust-gas flow is aligned as it flows through the flow alignment section. The offset cross section is offset as viewed proceeding from a cylindrical basic shape of the pipeline section. The offset cross section is at least partially offset in relation to the cross section of the cylindrical basic shape. The offset cross section may also be narrowed or widened in relation to the cross section of the cylindrical basic shape.

In this embodiment, the honeycomb body at the outlet end is not disposed directly at the outlet end. Instead, the flow alignment section is situated at the outlet end between the outlet end and the honeycomb body. In one particularly preferred embodiment, the flow alignment section is shaped in such a way that the outlet end of the device is in alignment with the inlet end of the device. The flow alignment section is provided, in particular, if the honeycomb body at the outlet end is disposed obliquely (with an angle of inclination with respect to the pipe axis) and/or so as to be offset in relation to a cylindrical basic shape of the pipeline section. Then, the aligned configuration of inlet end and outlet end can be restored by using the flow alignment section.

The flow alignment section may have at least one projection and at least one recess. A projection refers to a region of a wall of the pipeline section that generates a reduction in size of an interior space of the pipeline section. Looking into the pipeline section through the outlet end, a projection is visible within the pipeline section. A projection causes the pipeline section to be narrowed at least in regions. A projection can be defined by a projection height by which the projection projects into the pipeline section relative to the outlet end or a cylindrical basic shape. A recess refers to a region of a pipeline section that generates an increase in size of an interior space of the pipeline section. Looking into the pipeline section through the outlet end, a recess is visible outside the pipeline section. A recess can be defined by a recess depth by which the recess protrudes out of the pipeline section relative to the outlet end or a cylindrical basic shape.

It is preferably the case that, in the flow alignment section, a recess is disposed on the pipeline section opposite the metering device, whereas a projection is disposed on the side of the metering device. In this way, a particularly uniform alignment of the exhaust-gas flow at the outlet end is achieved, wherein particularly few vortices are generated in the exhaust-gas flow.

In a further embodiment, in the flow alignment section, in each case at least one recess and at least one projection are disposed on the pipeline section both opposite the metering device and also on the side of the metering device. The wall of the pipeline section then preferably has an undulating form. In particular, if the honeycomb body at the outlet end is disposed with an angle of inclination (obliquely) with respect to the pipe axis of the pipeline section, the exhaust-gas flow can be homogenized by using suitably configured projections and recesses with an undulating form. The undulating form or shape is then preferably directed oppositely to the angle of inclination of the honeycomb body at the outlet end.

At least one blade may also be disposed in the pipeline section in the region of the flow alignment section. The blade can assist the effect of the projections and/or recesses and improve the homogenization of the exhaust-gas flow at the outlet end. In particular, a blade may project into the pipeline section from a side of the device situated opposite the metering device. The blade preferably has a curved surface through the use of which the exhaust-gas flow is diverted.

The alignment section preferably has a section length corresponding to less than half of the diameter of the pipeline section. Through the use of such a length of the alignment section, it is possible to realize a particularly compact construction of the device. At the same time, an effective alignment of the exhaust-gas flow in the alignment section is possible if the projections and recesses are constructed in a suitable manner.

In accordance with yet a further advantageous feature of the device of the invention, a diameter of the pipeline section widens in conical fashion in a widening section between the at least one disk-shaped honeycomb body at the inlet end and the metering device. A widening of the diameter simultaneously yields a widening of the cross-sectional area of the pipeline section. In the widening section, a cross-sectional area preferably widens by 50% to 100% in relation to the cross-sectional area of the pipeline section. The diameter of the pipeline section downstream of the conical widening preferably corresponds to the primary diameter of the pipeline section. The diameter at the inlet end is accordingly preferably reduced in relation to the primary diameter. As a result of the conical widening, the exhaust-gas flow is slowed downstream of the disk-shaped honeycomb body at the inlet end. In this way, the throughflow speed can be reduced, and the residence time of the exhaust gas for the metering of the additive can be increased, wherein at the same time, it can be achieved that there is less influencing of the distribution of the additive.

In addition to the conical widening downstream of the inlet end, a conical narrowing of the pipeline section may be provided upstream of the disk-shaped honeycomb body at the outlet end, or at the outlet end itself.

In accordance with yet an added advantageous feature of the device of the invention, the pipeline section has, between the metering device and the outlet end, a bend with an angle of 10° to 45° [degrees]. A bend of this type diverts an exhaust-gas flow passing through the pipeline section. This gives rise to a pressure difference in the exhaust-gas flow over the cross-sectional area of the pipeline section, which can permit an advantageous distribution of the liquid additive in the exhaust-gas flow. For example, by using a bend of this type and the resulting pressure difference, it is possible for the exhaust-gas flow to be forced in the direction of the metering device, or for a transverse flow to be generated in the exhaust gas. In this way, the liquid additive that is metered is distributed in the exhaust-gas flow over the entire cross section of the pipeline section. Through the use of a disk-shaped honeycomb body at the outlet end, the vortex generated by the bend, or the pressure distribution generated in the exhaust-gas flow by the bend, can be at least partially eliminated again, in such a way that downstream components of an exhaust-gas treatment device into which the described device is integrated are not significantly influenced thereby.

The device is furthermore preferable if the pipeline section has a straight section between the metering device and the bend. A straight section of this type (which may also be an elongation or constituent part of the rectilinear section) may have a length corresponding to at least half, and at most three times, a primary diameter of the pipeline section. A straight section of this type forms a type of mixing path in which the exhaust gas flow and additive can be mixed (as completely as possible).

In accordance with yet an additional advantageous feature of the device of the invention, the metering device defines a metering direction and the metering direction predefines an impingement angle for the liquid additive of less than 90° with respect to the disk-shaped honeycomb body. The impingement angle is preferably less than 60° and particularly preferably less than 30°.

The impingement angle refers to an angle between the metering direction and a normal direction in relation to the disk-shaped honeycomb body (at the outlet end or inlet end). Accordingly, there is preferably an angle of greater than 60° between a surface of the disk-shaped honeycomb body (which surface is at right angles to the normal direction in relation to the honeycomb body) and the metering direction. This makes it possible for the additive to be metered into the pipeline section at a shallow angle and with a relatively long path to the center of the honeycomb body.

A metering device preferably has a nozzle and/or an injector. The injector preferably has an installation axis. The metering direction typically corresponds to the installation axis of the injector or of the nozzle. The installation axis (or the central axis of the opening provided for the same) and the metering direction preferably also correspond to an axis or a central line of a spray cone of the metering device. The liquid additive metered in by using the metering device can impinge on the disk-shaped honeycomb body situated at the outlet end. For this purpose, the distance between the metering device and the disk-shaped honeycomb body at the outlet end must be suitably configured in a manner dependent on the spray characteristics of the metering device and the exhaust-gas flow.

In order to ensure a uniform distribution of the liquid additive in the exhaust-gas flow (and upon impingement on the disk-shaped honeycomb body at the outlet end), it is advantageous for the above-described impingement angle of less than 30°, preferably less than 15° and particularly preferably less than 10° to exist between the metering direction of the metering device and the disk-shaped honeycomb body.

In accordance with again another advantageous feature of the device of the invention, the disk-shaped honeycomb body toward which the central axis is directed is disposed with an angle of inclination with respect to a pipe axis of the pipeline section. In other words, this also means, for example, that the disk-shaped honeycomb body is inclined relative to the pipe axis by the angle of inclination. The angle of inclination preferably lies between 2° and 30°, preferably between 5° and 30° and particularly preferably between 10° and 30°.

The angle of inclination and the impingement angle together form an overall angle between the pipe axis and the metering direction or the central axis of the opening.

In accordance with again a further advantageous feature of the device of the invention, the at least one disk-shaped honeycomb body (at the inlet end and/or the at least one disk-shaped honeycomb body at the outlet end, respectively) has a honeycomb body length of less than 30% and preferably less than 20% of the (primary) diameter of the pipeline section. The two disk-shaped honeycomb bodies preferably have a length of less than 50 mm, preferably less than 40 mm and particularly preferably less than 30 mm. It can thus firstly be achieved that the desired homogenization of the flow entering the device and/or of the flow exiting the device can be attained. Secondly, the flow resistance of the honeycomb bodies is reduced by using this particularly short construction.

The disk-shaped honeycomb bodies may each have an active coating. For example (in the case of the additive being metered-in in the flow direction), the disk-shaped honeycomb body at the inlet end may have a catalytically active coating for the purpose of burning exhaust-gas constituents and increasing the temperature of the exhaust-gas flow (oxidation catalytic converter). Through the use of an increased temperature, the subsequent conversion of the liquid additive is improved. The disk-shaped honeycomb body at the outlet end preferably has a hydrolytically active coating if reducing agent is metered-in (in the flow direction). In particular, in the case of reducing agent precursor solution (and particularly preferably urea-water solution), it can be achieved by using the hydrolysis coating that the liquid additive is converted into ammonia which, in exhaust-gas purification components situated downstream as viewed in the exhaust-gas flow direction, can be utilized, for example, for implementing the process of selective catalytic reduction. If the additive is metered-in counter to the flow direction, it is (also) possible for the honeycomb body at the inlet end to (partially) have a hydrolytically active coating.

It is also possible for further devices for manipulating the exhaust gas to be provided in the device between the inlet end and the outlet end. For example, it is possible for a static mixing element to be provided immediately downstream of the metering device and/or immediately upstream of the metering device and/or adjacent the outlet end. A mixing element of that type may, for example, be constructed from guide plates which induce a vortex in the exhaust-gas flow and thus contribute to an intensive distribution of the liquid additive in the exhaust-gas flow. It is likewise possible for the static mixing element to be formed with a (disk-shaped) honeycomb body with channel walls, which channel walls have holes (in particular multiple holes that connect adjacent channels) and/or guide blades that project into the channel.

With the objects of the invention in view, there is concomitantly provided a motor vehicle, comprising an internal combustion engine and an exhaust-gas treatment device for the purification of the exhaust gases of the internal combustion engine, wherein the exhaust-gas treatment device has at least one device according to the invention. In this case, the device is, in particular, fastened (in a gas-tight and permanent manner) to an adjoining exhaust line by way of the connection devices described above.

Other features which are considered as characteristic for the invention are set forth in the appended claims, noting that the features specified individually in the claims may be combined with one another in any desired technologically meaningful way and may be supplemented by explanatory facts from the description, with further embodiments of the invention being specified.

Although the invention is illustrated and described herein as embodied in a device for exhaust-gas purification and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
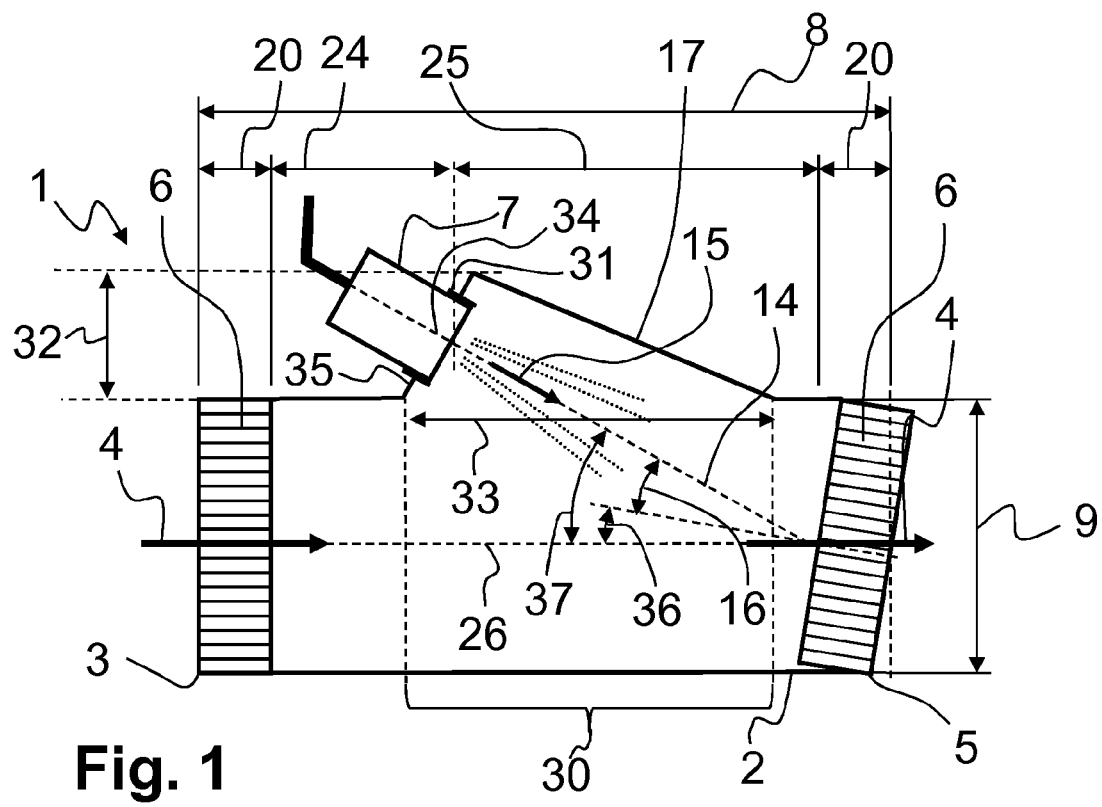
FIG. 1 is a diagrammatic, longitudinal-sectional view of a first embodiment of the device according to the invention.

Referring now to the figures of the drawings in detail and first, particularly, to FIGS. 1 to 5 thereof, there are seen different embodiments of a device 1. Corresponding features in FIGS. 1 to 5 will firstly be explained jointly herein. FIGS. 1 to 5 each illustrate a device 1 which has a pipeline section 2 for an exhaust-gas flow, the pipeline section having an inlet end 3 and an outlet end 5. An exhaust-gas flow 4 can enter the device 1 at the inlet end 3 and the exhaust-gas flow can exit the device 1 again at the outlet end 5. At least one respective disk-shaped honeycomb body 6 is disposed at each of the inlet end 3 and the outlet end 5. A metering device 7 for a liquid additive is disposed between the inlet end 3 and the outlet end 5, in a protuberance 17 of the pipeline section 2.

Various geometric relationships of the various components of the device 1 relative to one another will be explained with regard to FIGS. 1 and 2. The explanations can also be applied to FIGS. 3 to 5, and therefore they will firstly be described jointly herein. The device 1 and the pipeline section 2 each have a length 8 and a diameter 9. The disk-shaped honeycomb bodies 6 at the inlet end 3 and at the outlet end 5 each have a honeycomb body length 20. The pipeline section 2 has a pipe axis 26. The metering device 7 is disposed downstream of the disk-shaped honeycomb body 6 at the inlet end 3 so as to be separated therefrom by an inflow length 24 with respect to the pipe axis 26. The metering device 7 is followed by the disk-shaped honeycomb body 6 at the outlet end 5 so as to be separated therefrom by an outflow length 25 along the pipe axis 26. Some embodiments of the described device 1 have a pipeline section 2 with a bend 11. The bend 11 is illustrated by way of example in FIG. 2. The bend 11 preferably has an angle 12. The bend 11 is illustrated in FIG. 2 by way of a kink. The bend 11 may also be a continuous transition between a first direction of the pipeline section 2 at the inflow end 3 and a second direction of the pipeline section 2 at the outflow end 5.

Figure 2:
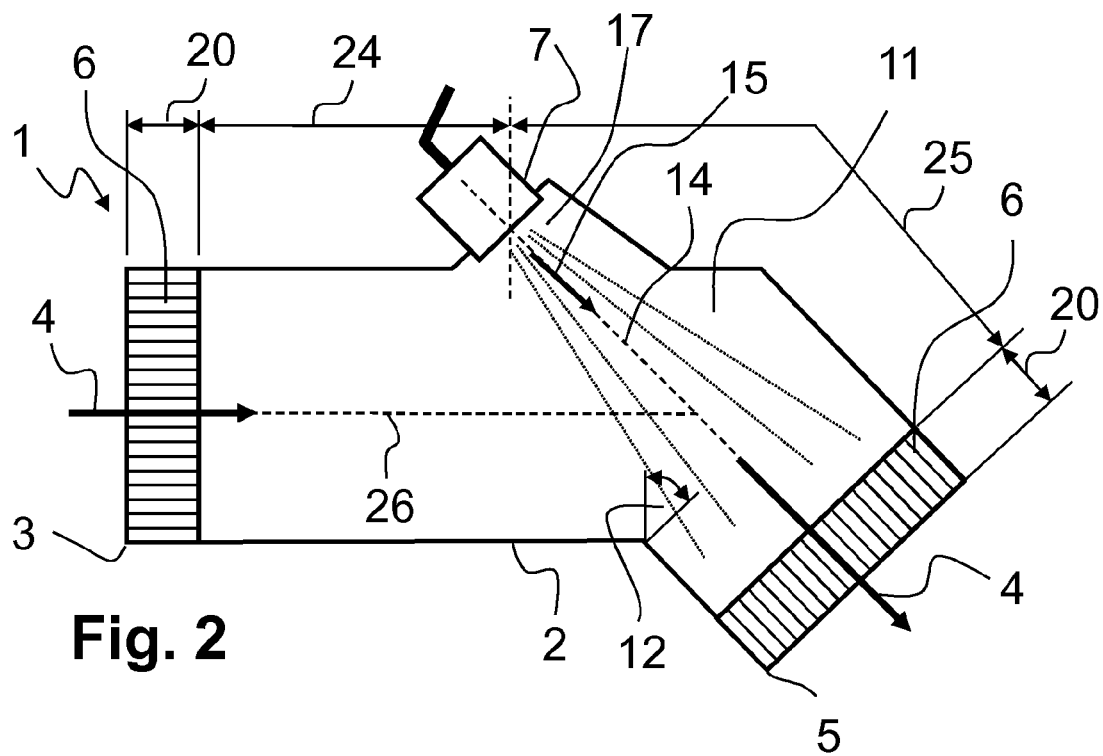
FIG. 2 is a longitudinal-sectional view of a second embodiment of the device.

It is also illustrated in FIG. 1 that the protuberance 17 is placed in a rectilinear section 30 of the pipeline section 2. The protuberance 17 extends over an extent 33. The extent 33 may also be referred to as the length of the protuberance 17. The protuberance 17 also has a height 32. The protuberance 17 projects beyond a basic shape of the pipeline section 2 by the height 32. The protuberance 17 has a flank or edge 35 with an opening 31. The metering device 7 is inserted into the opening 31. The opening 31 has a center direction or central axis 34 which is directed centrally toward the disk-shaped honeycomb body 6 at the outlet end 5. The central axis 34 preferably corresponds to an axis 14 of the metering device 7 and to a metering direction 15 of the metering device 7.

FIG. 1 illustrates by way of example that the metering device 7 has the axis 14 and that the metering device 7, by way of its axis 14, defines the metering direction 15. There is an impingement angle 16 between the metering direction 15 and the direction of a normal to the disk-shaped honeycomb body 6 at the outlet end 5. The impingement angle 16 is preferably less than 90°, preferably less than 60° and particularly preferably less than 30°. The direction of the normal to the disk-shaped honeycomb body 6 at the outlet end 5 does not need to be parallel to the pipe axis 26. It is possible for the disk-shaped honeycomb body 6 to be inclined with respect to the pipe axis 26 by an angle of inclination 36. The angle of inclination 36 and the impingement angle 16, added together, form an overall angle 37 between the pipe axis 26 and the metering direction 15 or the axis 14. The angular relationships illustrated herein by way of example for a honeycomb body at the outlet end may also apply if the axis 14 or the metering direction 15, and the central axis 34, are directed not toward a disk-shaped honeycomb body 6 at the outlet end 5 but rather toward a disk-shaped honeycomb body 6 at the inlet end 3 of the device 1.

FIG. 2 shows the situation of the pipe axis 26 if the pipeline section 2 has the bend 11. The pipe axis 26 preferably forms a central line of the pipeline section 2.

FIGS. 1 and 2 show how the location at which the metering device 7 is situated in the pipeline section 2 is defined. That point of the metering device 7, relative to which the inflow length 24 and the outflow length 25 described further above are defined, is preferably the point at which the liquid additive enters the pipeline section 2 or the exhaust-gas flow 4 in the pipeline section 2. The point preferably lies in a plane which is perpendicular to the pipe axis 26. The inflow length 24 and the outflow length 25 are preferably determined in relation to the imaginary plane.

Figure 3:
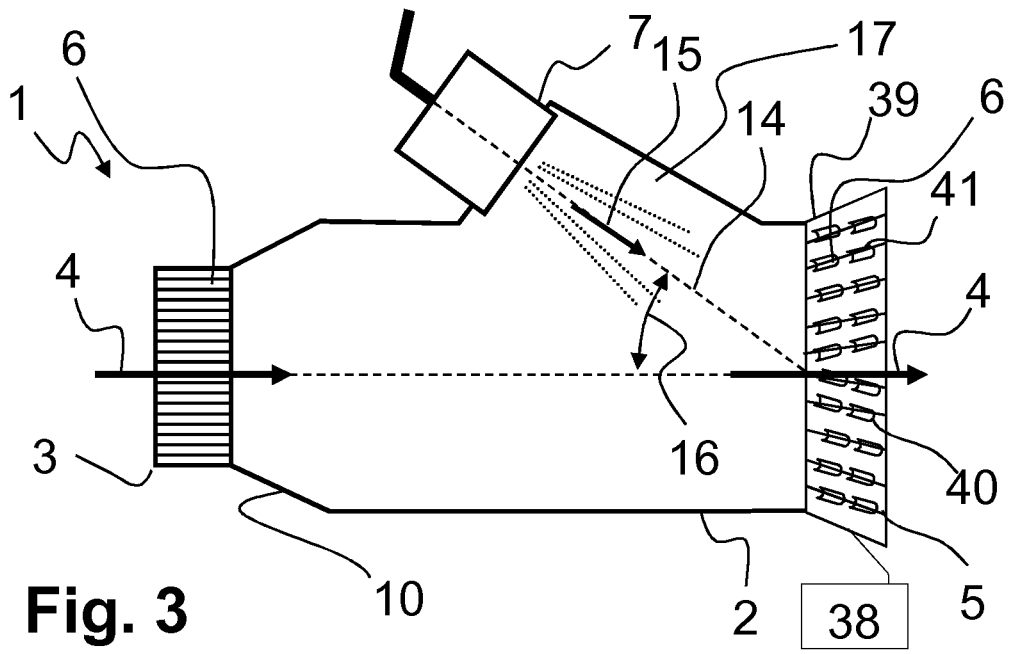
FIG. 3 is a longitudinal-sectional view of a third embodiment of the device.

FIG. 3 shows by way of example that the axis 14 of the metering device 7 and the metering direction 15, which is defined by the axis 14 and the metering device 7, are oriented at an impingement angle 16 with respect to a direction of a normal to the disk-shaped honeycomb body 6 at the outlet end 5. Furthermore, FIG. 3 shows a widening section 10 of the pipeline section 2. The pipeline section 2, or the diameter of the pipeline section 2, widens at the widening section 10. The widening section 10 has a conical shape and, as viewed in the direction of the exhaust-gas flow 4, is disposed downstream of the disk-shaped honeycomb body 6 at the inlet end and upstream of the metering device 7.

The disk-shaped honeycomb body 6 positioned downstream of the metering device 7 also has a conical shape 39. Channels 40 of the disk-shaped honeycomb body 6 widen in the direction of the exhaust-gas flow and have a structure 41 (for example in the form of guide blades and/or holes). Furthermore, the disk-shaped honeycomb body 6 is equipped with an electric heater 38 that can be activated/deactivated as required. The disk-shaped honeycomb body 6 may likewise be coated.

Figure 4:
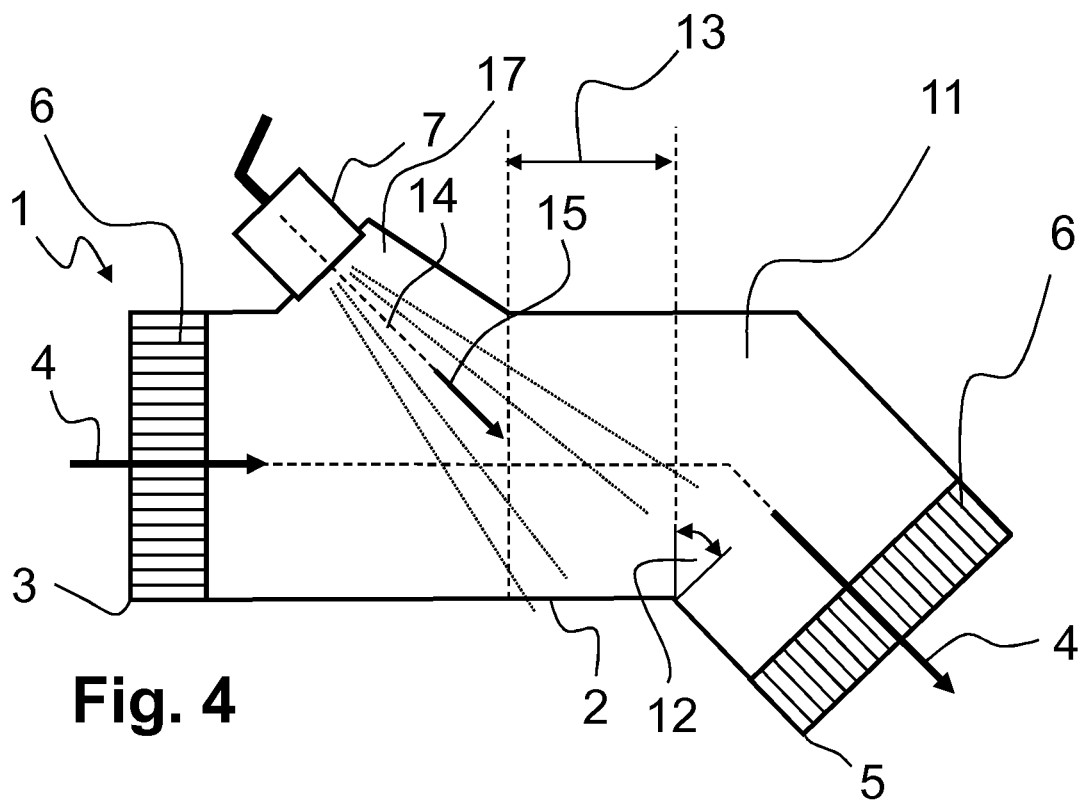
FIG. 4 is a longitudinal-sectional view of a fourth embodiment of the device.

FIG. 4 shows that a straight section 13 may be situated between the metering device 7 and a bend 11 of the pipeline section 2. This straight section can act as a mixing path for the exhaust-gas flow 4 and the liquid additive.

Figure 5:
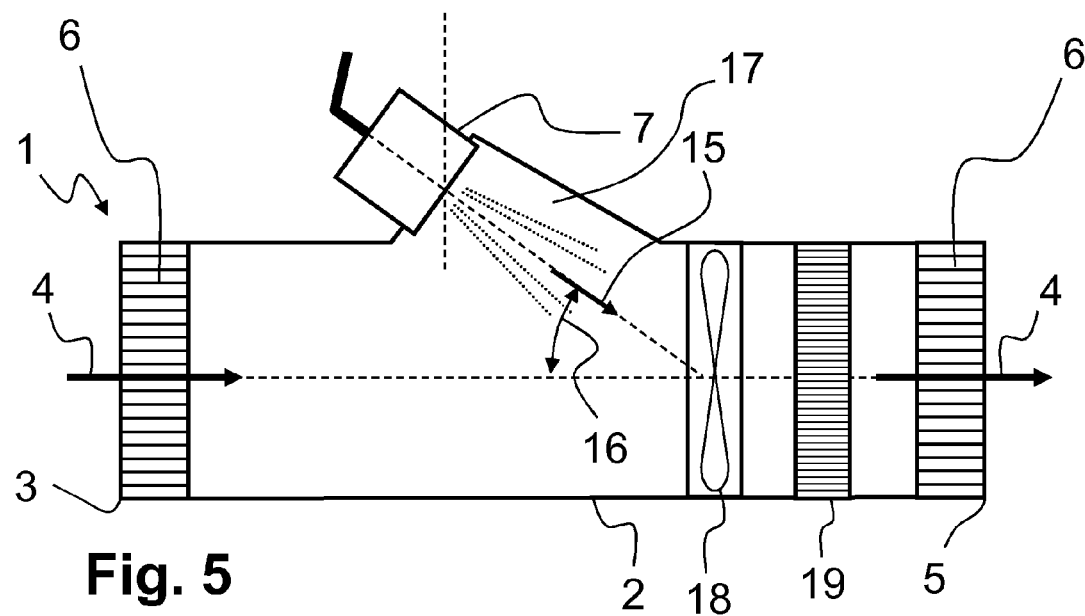
FIG. 5 is a longitudinal-sectional view of a fifth embodiment variant of the device.

FIG. 5 shows that further components for exhaust-gas purification may be disposed in the device 1 in addition to the disk-shaped honeycomb bodies 6 at the inlet end 3 and at the outlet end 5. In this case, the illustration shows, by way of example, a hydrolysis catalytic converter 19 and a static mixer 18, which are both disposed downstream of the metering device 7 as viewed in the direction of the exhaust-gas flow 4.

In the illustrated embodiments of the device, a mixer and/or a honeycomb body having projections, blades, holes and/or diverting surfaces in the channel wall, as described above, may generally also be positioned (as the final component) at the outlet end 5.

Figure 6:
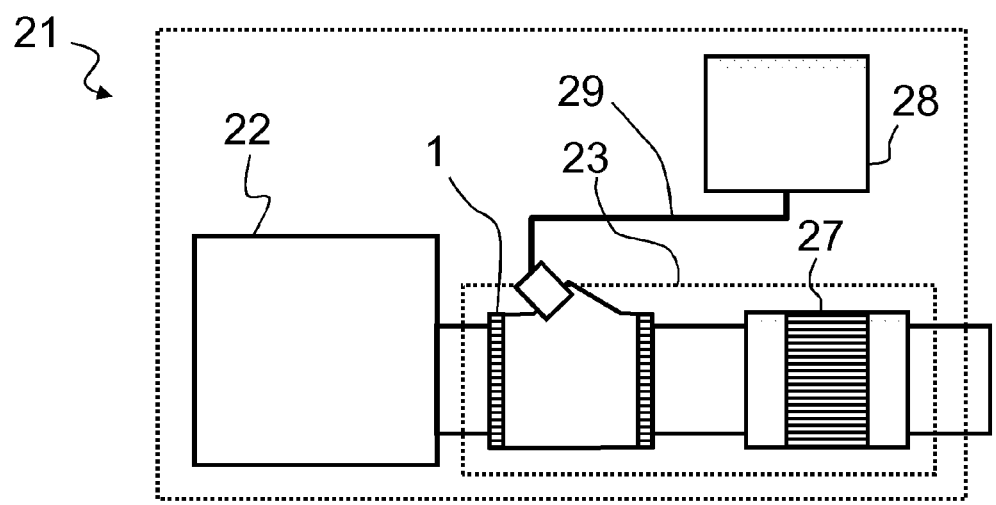
FIG. 6 is a block diagram of a motor vehicle having a device of this type.

FIG. 6 shows a motor vehicle 21 having an internal combustion engine 22 and an exhaust-gas treatment device 23. A device 1 is integrated, as an exhaust-gas purification module, into the exhaust-gas treatment device 23. The metering device (which is not illustrated herein in detail) of the device 1 is supplied with liquid additive from a tank 28 through a line 29. An SCR catalytic converter 27 is additionally provided in the exhaust-gas treatment device 23. A reducing agent precursor solution, and in particular an aqueous urea solution, are preferably fed to the exhaust-gas treatment device 23 as a liquid additive by the device 1. The process of selective catalytic reduction can take place in the SCR catalytic converter 27 with the reducing agent precursor solution, or with ammonia that has formed in the exhaust-gas treatment device on the basis of the reducing agent precursor solution, for the purpose of purifying the exhaust gases of the internal combustion engine 22.

Figure 7:
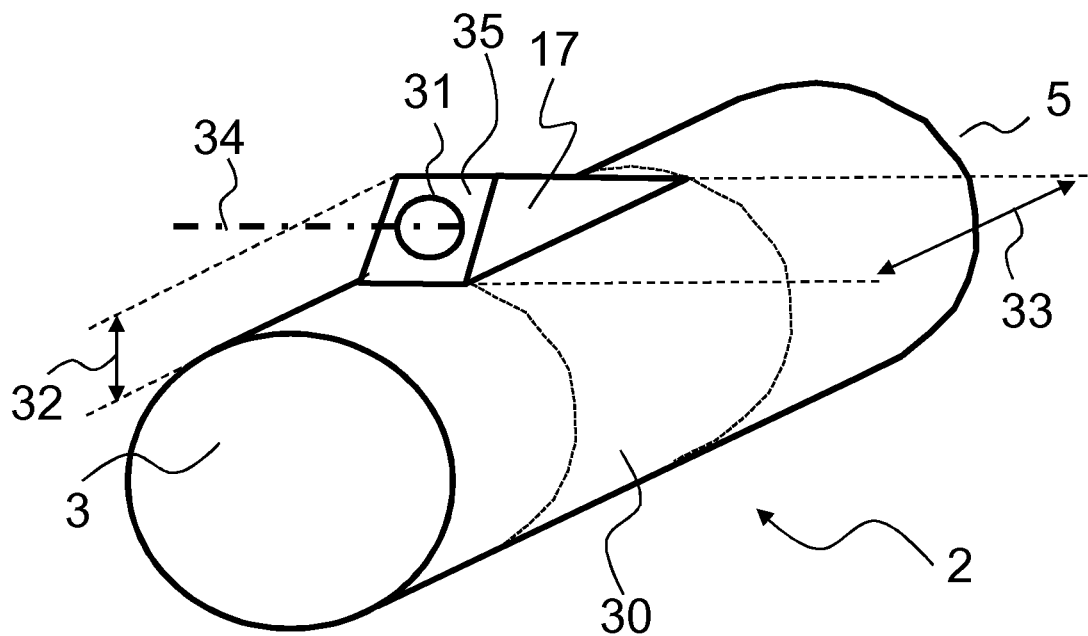
FIG. 7 is a perspective view of a pipeline section for a device.

FIG. 7 shows a perspective view of a pipeline section 2 for a device as described herein. The figure shows the protuberance 17 on the pipeline section 2 in a rectilinear section 30. The protuberance 17 has a height 32 and an extent 33, wherein the extent 33 predefines the length of the protuberance 17. Due to the protuberance 17, a flank 35 is formed on the pipeline section 2 in the protuberance 17. An opening 31 is provided in the pipeline section 2 on the flank 35. The opening 31 has a central axis 34.

Figure 8:
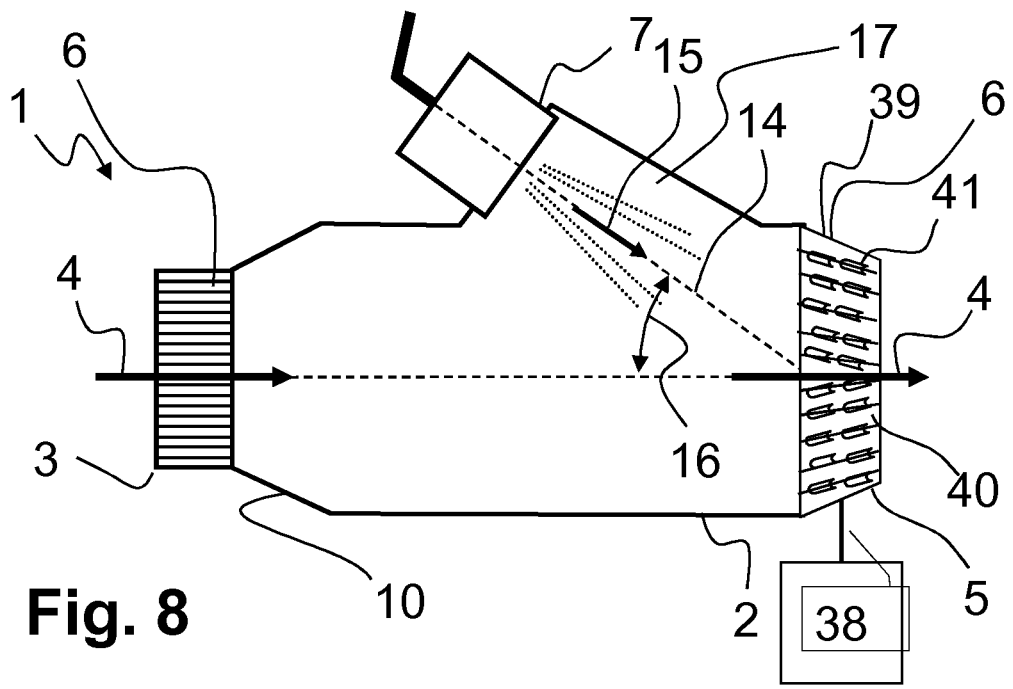
FIG. 8 is a longitudinal-sectional view of a sixth embodiment of the device.

FIG. 8 shows a modification of the device 1 illustrated in FIG. 3. Most of the features correspond to the embodiment illustrated in FIG. 3. The disk-shaped honeycomb body 6 positioned downstream of the metering device 7 also has a conical shape 39. In this case, however, the channels 40 of the disk-shaped honeycomb body 6 narrow in the direction of the exhaust-gas flow 4 and (optionally) have a structure 41 (for example in the form of guide blades and/or holes). In exactly the same way as FIG. 3, the honeycomb body 6 may have a heater 38 and a coating.

Figure 9:
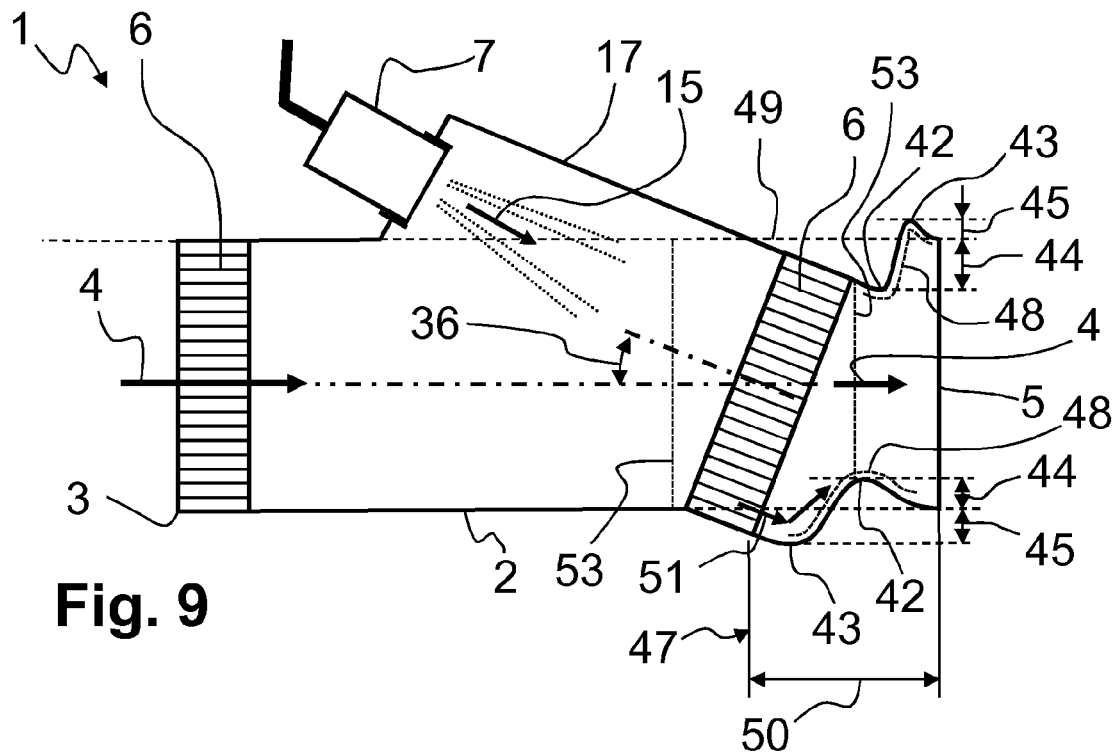
FIG. 9 is a longitudinal-sectional view of a seventh embodiment of the device.
Figure 10:
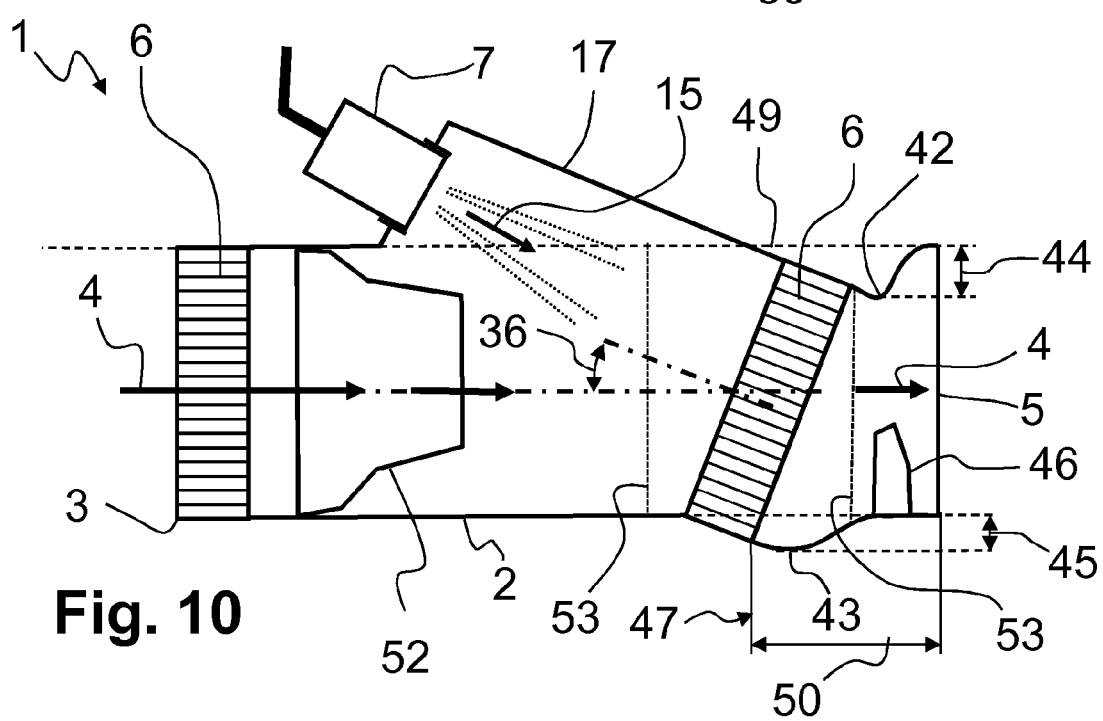
FIG. 10 is a longitudinal-sectional view of an eighth embodiment of the device.

FIG. 9 and FIG. 10 show two further embodiments of devices 1. The devices 1 also each have a pipeline section 2 with a pipe axis 26 for the exhaust-gas flow 4. The pipeline section 2 extends from an inlet end 3 to an outlet end 5. One respective disk-shaped honeycomb body 6 is disposed at each of the inlet end 3 and the outlet end 5. The pipeline section has a protuberance 17 between the honeycomb bodies 6, on which a metering device 7 for liquid additive is disposed. The metering device 7 sprays the liquid additive into the pipeline section 2 in a metering direction 15. The metering direction 15 is directed toward the honeycomb body 6 at the outlet end 5. The honeycomb body 6 at the outlet end 5 is disposed obliquely, with an angle of inclination 36, with respect to the pipe axis 26. The pipeline section 2 also has a flow alignment section 47 between the honeycomb body 6 at the outlet end 5 and the outlet end 5 itself.

The flow alignment section 47 serves for aligning an exhaust-gas flow 4 exiting the oblique honeycomb body 6 in such a way that the exhaust-gas flow exits the pipeline section 2 again substantially parallel to the pipe axis 26. In the flow alignment section 47, the pipeline section 2 has a cross section 53 which is offset in relation to the cross section 53 of a cylindrical basic shape 49 of the pipeline section 2. In this case, the cross section 53 refers to that cross-sectional area of the pipeline section 2 through which exhaust gas can freely flow. In order to form the offset cross section 53, the flow alignment section 47 has projections 42 and recesses 43. The projections 42 each project into the pipeline section 2 by a projection height 45 proceeding from the cylindrical basic shape 49 of the pipeline section 2. The recesses 43 each project out of the pipeline section 2 by a recess depth 45 proceeding from the cylindrical basic shape 49 of the pipeline section 2. The flow alignment section 47 has a section length 50.

In the flow alignment section 47 in the embodiment according to FIG. 9, one projection 42 and one recess 44 are provided in each case both on the top side of the device 1 at the metering device 7 and also on the bottom side of the device 1 (opposite the metering device 7). The pipeline section 2 thus has an undulating shape 48 in the flow alignment section 47. It is indicated herein by using arrows 51 that the undulating shape 48, opposite the metering device 7, is directed oppositely to the angle of inclination 36 of the honeycomb body 6 at the outlet end 5.

In the embodiment according to FIG. 10, a projection 42 is provided on the top side of the device 1 at the metering device 7, whereas a recess 43 is provided on the bottom side, opposite the metering device 7. In addition, in FIG. 10, a blade 46 is also provided in the flow alignment section 47. The alignment of an exhaust-gas flow 4 is assisted by the blade. An additional feature that can be seen in the embodiment of the device 1 in FIG. 10 is a nozzle 52 that focuses the exhaust-gas flow 4 downstream of the honeycomb body 6 at the inlet end 3.

The nozzle 52 may basically also be used as an alternative to (or replacement for) the first honeycomb body 6 at the inlet end 3, in which case the object set out in the introduction is likewise achieved. Therefore, this construction may also be combined with all of the other features of the configurations of the device proposed herein and constitute an independent improvement in relation to the known devices.

The device described herein makes it possible for a feed device for liquid additive to be used in an exhaust-gas treatment device without problems. The device described herein is advantageous, in particular, for small production runs of utility vehicles because the construction of further components of an exhaust-gas purification system does not have to be coordinated with the feed device, and instead, the device described herein can be treated as a self-contained system in which an exhaust-gas mass flow enters at the inlet end and the exhaust-gas mass flow exits the device again at the outlet end, with the exhaust-gas mass flow then containing liquid additive. No consideration needs to be given to internal flow conditions within the device.

Finally, it is also pointed out that the specific combinations of features shown in the figures are generally not imperative, and if appropriate, features from different figures may be combined with one another. The only exceptions to this are where explicitly stated above or where imperatively clear to a person skilled in the art.

The invention claimed is:

1. A device, comprising:
    a pipeline section configured to conduct an exhaust-gas flow, said pipeline section having a wall, a longitudinal axis, an inlet end, an outlet end, a rectilinear section and a protuberance;
    at least one respective disk-shaped honeycomb body disposed at each of said inlet end and said outlet end;
    said protuberance having an overall height above said wall and an overall extent along said longitudinal axis, said overall extent being at least twice as great as said overall height, and said protuberance having an opening formed therein defining a central axis of said opening directed toward one of said disk-shaped honeycomb bodies; and
    a metering device installed in said opening and configured to introduce a liquid additive into said rectilinear section;
    said pipeline section having a bend upstream of said at least one respective disk-shaped honeycomb body disposed at said outlet end and between said metering device and said outlet end, and said bend having an angle of between 10° and 45°.

2. The device according to claim 1, wherein at least one of said disk-shaped honeycomb bodies disposed at said inlet end or at said outlet end has a conical shape.

3. The device according to claim 1, which further comprises a nozzle disposed in said pipeline section between said at least one disk-shaped honeycomb body at said inlet end and said metering device, said nozzle configured to focus the exhaust-gas flow centrally in said pipeline section.

4. The device according to claim 1, wherein said pipeline section has a diameter and a length from said inlet end to said outlet end corresponding to more than two times and less than five times said diameter.

5. The device according to claim 1, wherein said at least one disk-shaped honeycomb body at said inlet end has a channel density of from 20 cpsi [channels per square inch] to 200 cpsi.

6. The device according to claim 1, wherein said pipeline section has a flow alignment section between said at least one disk-shaped honeycomb body at said outlet end and said outlet end, said pipeline section having a cross section being at least partially offset in said flow alignment section.

7. The device according to claim 1, wherein said pipeline section has a diameter widening conically in a widening section between said at least one disk-shaped honeycomb body at said inlet end and said metering device.

8. The device according to claim 1, wherein said pipeline section has a straight section between the metering device and said bend.

9. The device according to claim 8, wherein said straight section has a length corresponding to at least half, and at most three times, a diameter of said pipeline section.

10. The device according to claim 1, wherein said metering device defines a metering direction and said metering direction predefines an impingement angle for the liquid additive of less than 90° relative to said at least one disk-shaped honeycomb body.

11. The device according to claim 1, wherein said pipeline section has a diameter, and at least one of said disk-shaped honeycomb bodies has a honeycomb body length of less than 30% of said diameter.

12. A motor vehicle, comprising:
an internal combustion engine; and
an exhaust-gas treatment device configured to purify exhaust gases of said internal combustion engine, said exhaust-gas treatment device having at least one device according to claim 1.

13. The device according to claim 1, wherein said at least one respective disk-shaped honeycomb body disposed at each of said inlet end and said outlet end define terminations of said pipeline section.

14. The device according to claim 13, wherein said at least one respective disk-shaped honeycomb body disposed at each of said inlet end and said outlet end are flush with a corresponding said inlet end and said outlet end.

15. The device according to claim 1, wherein said pipeline section is constructed for being connected to further sections of an exhaust gas line.

16. The device according to claim 1, wherein at least one of said at least one respective disk-shaped honeycomb body disposed at each of said inlet end and said outlet end are constructed for homogenizing the exhaust-gas flow.

17. A device, comprising:
a pipeline section configured to conduct an exhaust-gas flow, said pipeline section having an inlet end, an outlet end, a rectilinear section and a protuberance said pipeline section having a longitudinal pipe axis;
at least one respective wound disk-shaped honeycomb body of smooth and corrugated foils disposed at each of said inlet end and said outlet end;
said protuberance having a height and an extent being at least twice as great as said height, and said protuberance having an opening formed therein defining a central axis of said opening directed toward one of said disk-shaped honeycomb bodies, and said at least one disk-shaped honeycomb body toward which said central axis is directed being disposed at an oblique angle of inclination relative to said longitudinal pipe axis; and
a metering device installed in said opening and configured to introduce a liquid additive into said rectilinear section.

* * * * *